(12) United States Patent
Matsuo et al.

(10) Patent No.: US 8,521,230 B2
(45) Date of Patent: Aug. 27, 2013

(54) MOBILE TELEPHONE

(75) Inventors: Naoki Matsuo, Daito (JP); Hideji Kawasaki, Daito (JP); Tatsuhiko Abe, Daito (JP)

(73) Assignee: KYOCERA Corporation, Kyoto (JP)

( * ) Notice: Subject to any disclaimer, the term of this patent is extended or adjusted under 35 U.S.C. 154(b) by 283 days.

(21) Appl. No.: 13/001,608

(22) PCT Filed: Mar. 31, 2009

(86) PCT No.: PCT/JP2009/056653
§ 371 (c)(1),
(2), (4) Date: Dec. 27, 2010

(87) PCT Pub. No.: WO2009/157242
PCT Pub. Date: Dec. 30, 2009

(65) Prior Publication Data
US 2011/0111809 A1     May 12, 2011

(30) Foreign Application Priority Data
Jun. 27, 2008   (JP) ................ 2008-169233

(51) Int. Cl.
*H04B 1/38* (2006.01)
(52) U.S. Cl.
USPC ......................................... 455/566; 455/567
(58) Field of Classification Search
USPC .............................................. 455/566, 567
See application file for complete search history.

(56) References Cited

U.S. PATENT DOCUMENTS

| | | | |
|---|---|---|---|
| 7,660,609 B2 * | 2/2010 | Karan et al. | 455/567 |
| 2006/0003814 A1 * | 1/2006 | Moody et al. | 455/567 |
| 2007/0254627 A1 * | 11/2007 | Kikuchi et al. | 455/404.2 |
| 2008/0132196 A1 * | 6/2008 | Soh et al. | 455/404.1 |
| 2008/0297537 A1 * | 12/2008 | Ishikawa et al. | 345/690 |
| 2009/0137285 A1 * | 5/2009 | Lee | 455/567 |
| 2010/0009667 A1 * | 1/2010 | Hasegawa | 455/418 |

FOREIGN PATENT DOCUMENTS

| | | |
|---|---|---|
| JP | 3063580 U | 8/1999 |
| JP | 2003-338768 A | 11/2003 |
| JP | 2005-151271 A | 6/2005 |
| JP | 2006-203497 A | 8/2006 |
| JP | 2007-318208 A | 12/2007 |

OTHER PUBLICATIONS

International Search Report dated Jul. 7, 2009 issued by the Japanese Patent Office for International Application No. PCT/JP2009/056653.

* cited by examiner

*Primary Examiner* — Wen Huang
(74) *Attorney, Agent, or Firm* — Procopio, Cory, Hargreaves & Savitch LLP

(57) ABSTRACT

In the mobile telephone, an image display surface of a display is arranged on a front surface of a casing, and a camera is arranged on a rear surface thereof. The mobile telephone includes: a proximity sensor, and acceleration sensor, and a control circuit. The control circuit includes: a unit that detects that the casing has been placed on the object; a unit that performs a color conversion process for converting a color of each pixel into a complementary color on an image signal obtained from the camera before detection of that the casing has been placed on the object; and a unit that outputs a color-converted image on the image display surface when an incoming call/mail is received after detection of that the casing has been placed on the object.

14 Claims, 8 Drawing Sheets

FIG.10

| NUMBER IS REGISTERED IN TELEPHONE BOOK | DISPLAY COMPLEMENTARY COLOR-CONVERTED IMAGE |
|---|---|
| NUMBER IS REGISTERED IN TELEPHONE BOOK, AND THE NUMBER IS SPECIFIED | DISPLAY CALL/MAIL RECEPTION IMAGE IN ACCORDANCE WITH SET VALUE |
| NUMBER IS NOT REGISTERED IN TELEPHONE BOOK | DISPLAY CALL/MAIL RECEPTION IMAGE IN ACCORDANCE WITH DEFAULT VALUE 1 |
| THERE IS NO TELEPHONE NUMBER | DISPLAY CALL/MAIL RECEPTION IMAGE IN ACCORDANCE WITH DEFAULT VALUE 2 |
| NOTIFICATION OF TELEPHONE NUMBER IS NOT POSSIBLE | DISPLAY CALL/MAIL RECEPTION IMAGE IN ACCORDANCE WITH DEFAULT VALUE 3 |
| NOTIFICATION OF TELEPHONE NUMBER IS BLOCKED | DISPLAY PHOTOGRAPHED IMAGE CONTINUOUSLY |

FIG.11

| NUMBER IS REGISTERED IN TELEPHONE BOOK | DISPLAY COMPLEMENTARY COLOR-CONVERTED IMAGE WITH HIGHER BRIGHTNESS |
|---|---|
| NUMBER IS REGISTERED IN TELEPHONE BOOK, AND THE NUMBER IS SPECIFIED | DISPLAY COMPLEMENTARY COLOR-CONVERTED IMAGE WITH LOWER BRIGHTNESS |
| NUMBER IS NOT REGISTERED IN TELEPHONE BOOK | DISPLAY CALL/MAIL RECEPTION IMAGE IN ACCORDANCE WITH DEFAULT VALUE 1 |
| THERE IS NO TELEPHONE NUMBER | DISPLAY PHOTOGRAPHED IMAGE CONTINUOUSLY |
| NOTIFICATION OF TELEPHONE NUMBER IS NOT POSSIBLE | DISPLAY CALL/MAIL RECEPTION IMAGE IN ACCORDANCE WITH DEFAULT VALUE 2 |
| NOTIFICATION OF TELEPHONE NUMBER IS BLOCKED | DISPLAY PHOTOGRAPHED IMAGE CONTINUOUSLY |

FIG.12

| NUMBER IS REGISTERED IN TELEPHONE BOOK | DISPLAY COMPLEMENTARY COLOR-CONVERTED IMAGE |
|---|---|
| NUMBER IS REGISTERED IN TELEPHONE BOOK, AND THE NUMBER IS SPECIFIED | DISPLAY COMPLEMENTARY COLOR-CONVERTED IMAGE |
| NUMBER IS NOT REGISTERED IN TELEPHONE BOOK | DISPLAY CALL/MAIL RECEPTION IMAGE IN ACCORDANCE WITH DEFAULT VALUE 1 |
| THERE IS NO TELEPHONE NUMBER | DISPLAY PHOTOGRAPHED IMAGE CONTINUOUSLY |
| NOTIFICATION OF TELEPHONE NUMBER IS NOT POSSIBLE | DISPLAY PHOTOGRAPHED IMAGE CONTINUOUSLY |
| NOTIFICATION OF TELEPHONE NUMBER IS BLOCKED | DISPLAY PHOTOGRAPHED IMAGE CONTINUOUSLY |

MOBILE TELEPHONE

TECHNICAL FIELD

The present invention relates to a mobile telephone including a portable casing provided with an image display surface of an image display apparatus arranged on a front surface thereof and provided with an image photographing apparatus arranged on a rear surface thereof, and particularly to a mobile telephone capable of performing notification by displaying when a call or mail is received.

BACKGROUND ART

Conventionally, mobile telephones have been capable of displaying on a display various images such as an image downloaded from the Internet or an image photographed by a camera as a standby image at the time of standby for a call/mail reception. Along with development of information and communication technology of recent years, displays to be provided to mobile telephones have been growing in size, and the standby image is part of design of the whole telephone as well as casing. Therefore, various mobile telephones that can automatically change their standby images without user operations are proposed. The patent literature 1 discloses technology of changing standby images in accordance with images of the user or its surroundings photographed by a camera provided to a mobile telephone.

Also, when a call or mail is received, a conventional mobile telephone performs a notification with sound such as melody, and/or with vibration of a vibrator, as well as notification with call/mail reception indication on a display. At this time, above-mentioned standby image or a call/mail reception image set by the user is displayed as a call/mail reception indication image.

DISCLOSURE OF THE INVENTION

Problems to be Solved by the Invention

However, when a call or mail is received while a conventional mobile telephone is placed on a desk or floor, if the image displayed on the display harmonizes with color or design of the desk or floor, the mobile telephone main body is hardly found, and the call or mail may not be promptly answered. In particular, if "manner mode" in which notification with the vibrator is performed without performing notification with sound is set, the mobile telephone is hardly found.

Therefore, an object of the present invention is to provide a mobile telephone that can be easily found when a call or mail is received while the mobile telephone is placed on a desk or floor.

Means for Solving the Problem

A mobile telephone according to the present invention has a portable casing including an image display surface of an image display apparatus arranged on one side thereof and an image photographing apparatus arranged on the other side thereof, and comprises:
state detecting means that detects that the casing has been placed on an object; and
call/mail reception image display processing means that, when an incoming call or mail is received after it is detected that the casing has been placed on the object, displays on the image display surface of the image display apparatus an image contrasting to an image photographed by the image photographing apparatus before it is detected that the casing has been placed on the object.

In the mobile telephone according to the present invention described above, during the time when the telephone is placed on the object such as a desk or floor, a photographing operation is performed by the image photographing apparatus at least once before it is detected that the casing has been placed on the object. Here, since the mobile telephone is placed on the object such as a desk or floor generally with its surface where the image display surface of the image display apparatus is arranged facing upward, a surface of the object such as a desk or floor is photographed by the image photographing apparatus.

When an incoming call or mail is received after it is detected that the casing has been placed on the object, an image contrasting to the image photographed by the image photographing apparatus as described above is displayed on the image display surface. In this way, an image which is seen distinctly on the object such as a desk or floor is displayed on the image display surface, and therefore, the user can easily find the mobile telephone main body.

In the mobile telephone according to the present invention, the image display surface of the image display apparatus is arranged on a front surface of the portable casing and the image photographing apparatus is arranged on a rear surface of the portable casing. This mobile telephone comprises:
state detecting means that detects that the casing is becoming closer to an object and that the casing has been placed on the object;
photographing control means that operates the image photographing apparatus at least once after it is detected that the casing is becoming closer to the object and before it is detected that the casing has been placed on the object;
color conversion processing means that performs a color conversion process for converting a color of each of a part or all pixels forming an image signal obtained from the image photographing apparatus into a complementary color which is located on the opposite side in a color wheel or into a color which is located on the generally opposite side in the color wheel in accordance with one or a plurality of predetermined conversion rules on the image signal;
image signal storing means that stores one or a plurality of color-converted image signals obtained from the color conversion processing means; and
call/mail reception image display processing means that, when an incoming call or mail is received after it is detected that the casing has been placed on the object, outputs one of the one or plurality of color-converted image signals stored in the image signal storing means to the image display apparatus to display a color-converted image on the image display surface of the image display apparatus.

In the mobile telephone according to the present invention described above, when the telephone is placed on the object such as a desk or floor, a photographing operation is performed by the image photographing apparatus at least once after it is detected that the casing is becoming closer to the object and before it is detected that the casing has been placed on the object. Here, since the mobile telephone is placed on the object such as a desk or floor generally with the front surface of the casing where the image display surface of the image display apparatus is arranged facing upward, a surface of the object such as a desk or floor is photographed by the image photographing apparatus arranged on the rear surface of the casing.

The image signal obtained from the image photographing apparatus by the above described photographing operation is subjected to the color conversion process by the color conversion processing means in accordance with the one or plurality of predetermined conversion rules. In the color conversion process, a color of each of a part or all pixels forming the image signal is converted into the complementary color which is located on the opposite side in the color wheel or into a color which is located on the generally opposite side in the color wheel. Therefore, the color of each of a part or all pixels forming the image photographed by the image photographing apparatus is converted into a contrasting color which has strong contrast (great difference in color) in relation to each color. The one or plurality of color-converted image signals obtained in the color conversion process are stored in the image signal storing means.

And then, when an incoming call or mail is received (when telephone communication or an e-mail is received) after it is detected that the casing has been placed on the object, one of the one or plurality of color-converted image signals stored in the image signal storing means is outputted to the image display apparatus, and then the color-converted image is displayed on the image display surface. At this point, since the color-converted image has a color contrasting to that of the image photographed by the image photographing apparatus as described above, the color-converted image is seen distinctly on the object such as a desk or floor. Therefore, the user can easily find the telephone main body and answer promptly.

For example, if the telephone is placed on a black desk, a photographed image which is wholly black is obtained, and then this image is converted into an image which is wholly white by the color conversion process. Then, when an incoming call or mail is received, the color-converted image which is wholly white is displayed on the image display surface.

In particular, after a call or mail is received, the call/mail reception image display processing means repeats operation of displaying the color-converted image on the image display surface of the image display apparatus until a user operation is performed.

In the particular configuration described above, even if the user does not notice a received call or mail at the time when it is received, since the color-converted image is repeatedly displayed on the image display surface thereafter, the user is surely notified of the call/mail reception.

Also, in particular, the photographing control means operates the image photographing apparatus repeatedly after it is detected that the casing is becoming closer to the object and before it is detected that the casing has been placed on the object, and the color conversion processing means performs the color conversion process on the image signal obtained in the last photographing operation. Thus, the color-converted image of the image photographed immediately before the casing is placed on the object can be obtained.

Further, in particular, further included is photographed image display processing means that, when it is detected that the casing has been placed on the object, outputs the image signal obtained from the image photographing apparatus to the image display apparatus to display the original photographed image on the image display surface of the image display apparatus.

In the particular configuration described above, when it is detected that the casing has been placed on the object such as a desk or floor, an image photographed by the image photographing apparatus before then is displayed on the image display surface. Here, since the photographed image shows the surface of the object such as a desk or floor as described above, it harmonizes with a color and design of the surface of the object such as a desk or floor.

For example, when the mobile telephone is placed on a black desk as described above, the photographed image which is wholly black is displayed on the image display surface.

Further in particular, the call/mail reception image display processing means comprises:

selecting means that selects an image in accordance with a telephone number or address of transmission source from a plurality of kinds of images including one or a plurality of color-converted images and the original photographed image; and display processing means that displays the image selected by the selecting means on the image display surface of the image display apparatus.

In the particular configuration described above, when an incoming call or mail is received, the image in accordance with the telephone number or address of transmission source is displayed on the image display surface of the image display apparatus. For example, if the telephone number of transmission source is registered, the color-converted image described above is displayed on the image display surface, and if the telephone number of transmission source is blocked, the original photographed image described above is displayed on the image display surface.

Furthermore, in particular, the state detecting means comprises an acceleration sensor for detecting acceleration of the casing, and a proximity sensor arranged on the rear surface of the casing for detecting a distance from the object, and detects that the casing is becoming closer to the object based on an output value of the acceleration sensor and an output value of the proximity sensor, and that the casing has been placed on the object based on an output value of the acceleration sensor and an output value of the proximity sensor.

In the particular configuration described above, it is possible to detect that the casing is becoming closer to the object and that the casing has been placed on the object using common acceleration sensor and proximity sensor.

Effect of the Invention

With the mobile telephone according to the present invention, when an incoming call or mail is received while a casing is placed on an object such as a desk or floor, notification to a user can be performed in such a manner that the user easily notice.

BRIEF DESCRIPTION OF THE DRAWINGS

FIG. 10 shows an example of call/mail reception indication pattern;

FIG. 11 shows another example of call/mail reception indication pattern; and

FIG. 12 shows a further example of call/mail reception indication pattern.

EXPLANATION OF REFERENCE NUMERALS

1 Casing
5 Display
7 camera
8 Proximity sensor
15 Memory
16 Acceleration sensor

BEST MODE FOR CARRYING OUT THE INVENTION

A preferred embodiment of the present invention is described in detail below with reference to the drawings.

Figure 1:
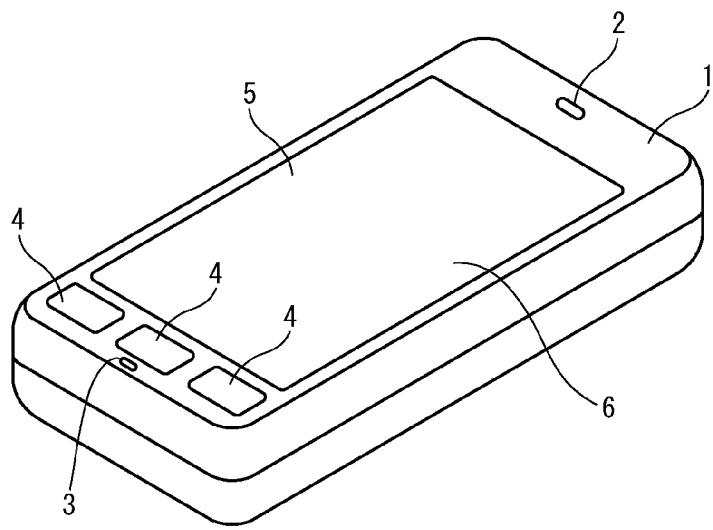
FIG. 1 is a perspective view showing a front surface of a mobile telephone in accordance with the present invention.

As shown in FIG. 1, a mobile telephone according to the present invention comprises a flat casing 1, and a front surface of the casing 1 is provided on its upper end part with a telephone receiver part 2 including a speaker therein and provided on its lower end part with a telephone transmitter part 3 including a microphone therein. Further, the front surface of the casing 1 is provided with a plurality of (three in the illustrated example) operation keys 4, 4, 4, and an image display surface of a display 5. An antenna (not shown) is included in a lower part of the casing 1.

Also, the mobile telephone described above includes a touch panel input device 6 as well as the operation keys 4, 4, 4 as data input devices, and the touch panel input device 6 has a transparent touch operation surface attached on the image display surface of the display 5. A plurality of touch input keys including a numerical keypad are displayed on the image display surface of the display 5, and when a user performs a touch operation on any of the touch input keys, information processing according to said touch input key is performed.

Figure 2:
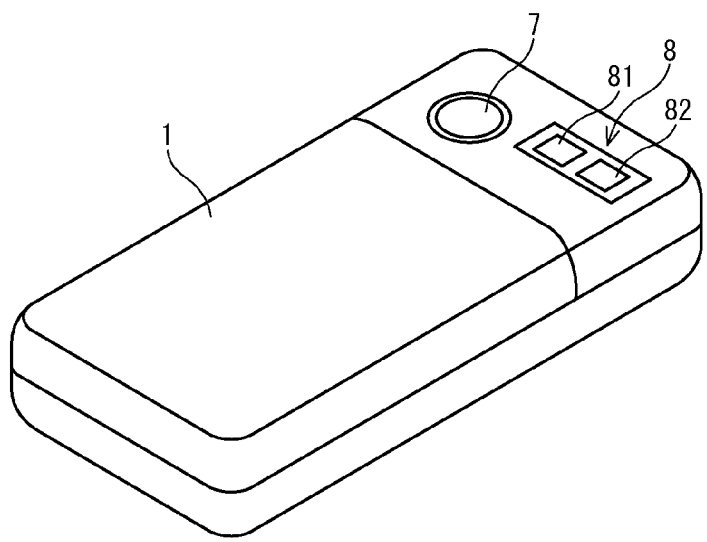
FIG. 2 is a perspective view showing a rear surface of the mobile telephone.

In contrast, as shown in FIG. 2, a rear surface of the casing 1 is provided on its upper end part with a camera 7 and a proximity sensor 8 that detects a distance from an object. The proximity sensor 8 comprises a light emitting section 81 that outputs infrared rays and a light receiving section 82 that receives the infrared rays emitted by the light emitting section 81 and then reflected on an object, and outputs a value according to the amount of the received light.

Figure 3:
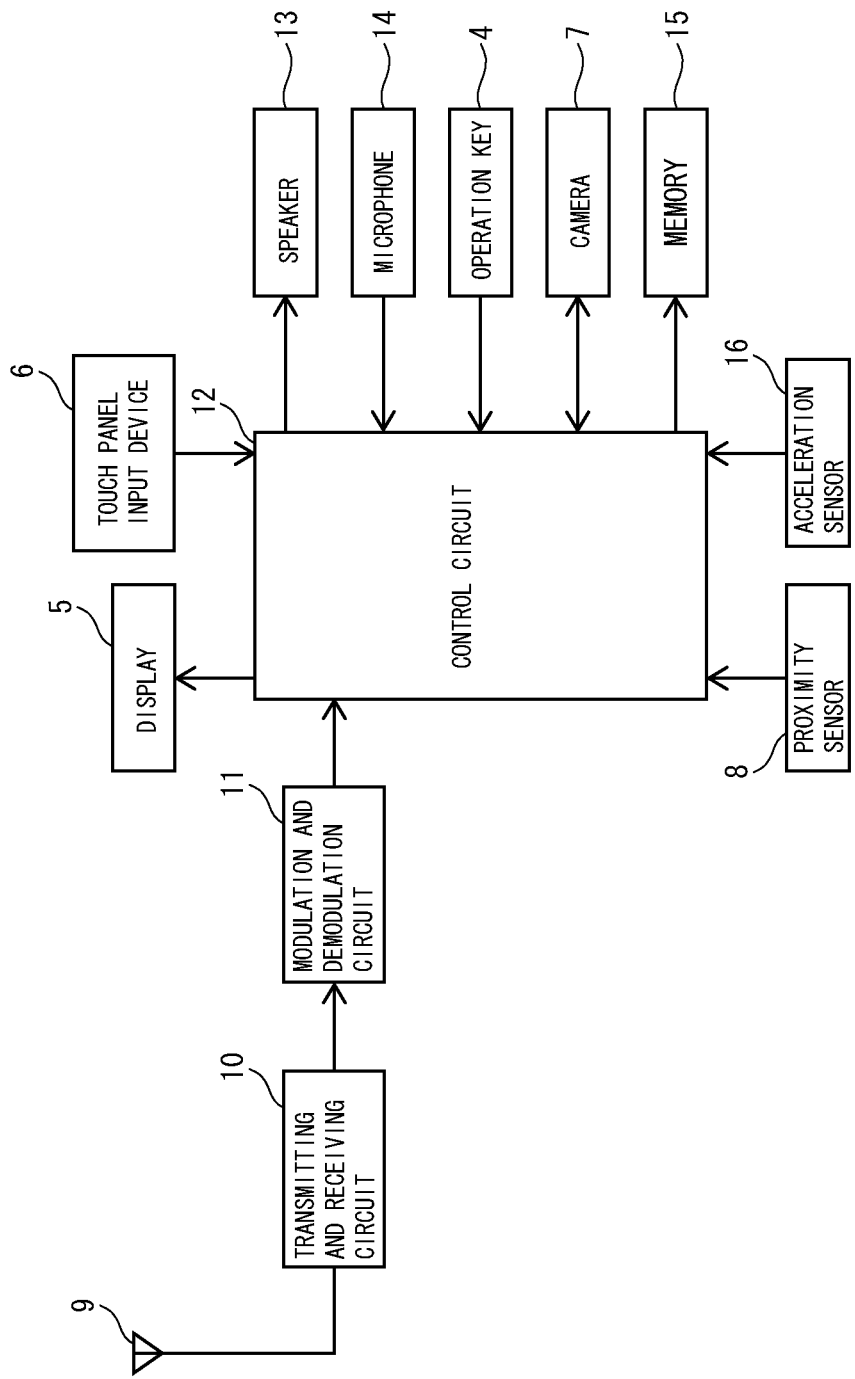
FIG. 3 is a block diagram representing an electrical structure of the mobile telephone.

FIG. 3 shows the electrical structure of the above described mobile telephone. A signal received by an antenna 9 is supplied to a modulation and demodulation circuit 11 via a transmitting and receiving circuit 10, and a reception signal is demodulated. This reception signal is supplied to a speaker via a control circuit 12, and emitted as sound. A transmission signal inputted from a microphone 14 is supplied to the modulation and demodulation circuit 11 via the control circuit 12, and subjected to modulation. The modulated transmission signal passes through the transmitting and receiving circuit 10 and is transmitted from the antenna 9.

To the control circuit 12, connected are the display 5, the touch panel input device 6, the operation keys 4 and the camera 7 which are described above, and a memory 15 for storing various information including image data.

Further, to the control circuit 12, connected are the proximity sensor 8 described above and an acceleration sensor 16 for detecting acceleration of the telephone main body.

Figure 9:
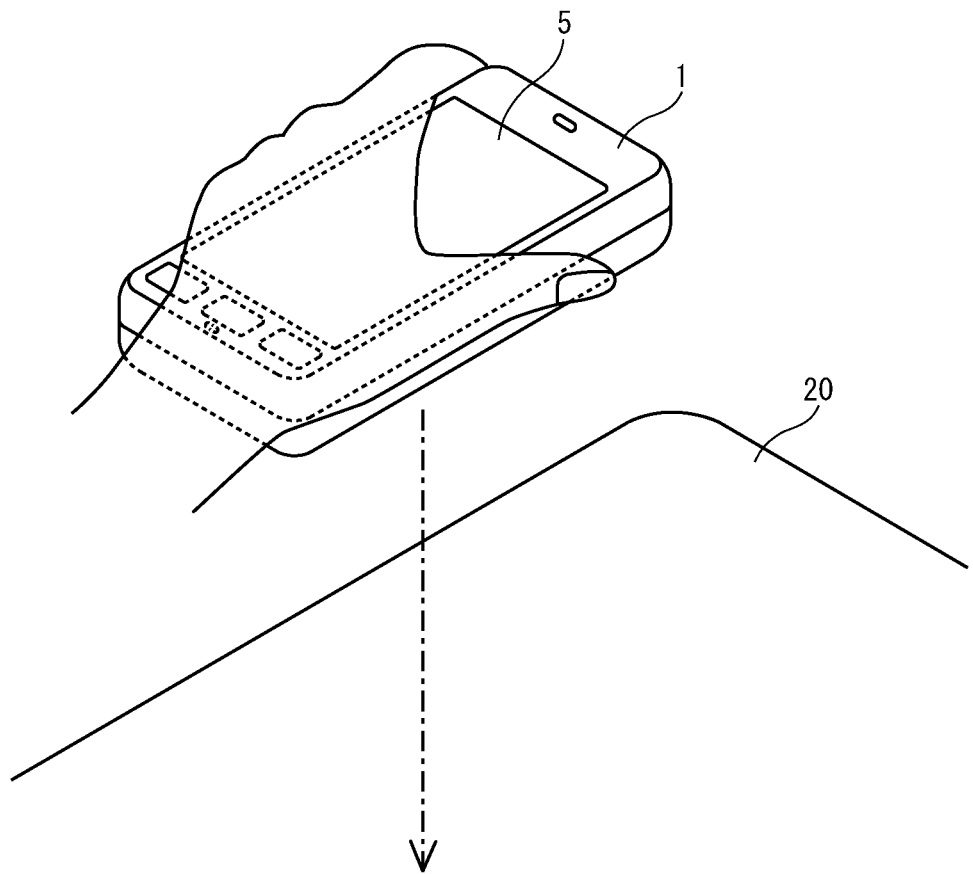
FIG. 9 is a perspective view for explaining an operation that is performed when the mobile telephone is placed on a desk.

The mobile telephone according to the present invention is placed on a desk 20 generally with the front surface of the casing where the image display surface of the display 5 is arranged facing upward, as shown in FIG. 9. During this action, image photographing by a camera arranged on the rear surface of the casing 1 is repeated from the time point when the casing 1 reaches a position where a distance from the desk 20 is a certain distance. Thereafter, the image photographing by the camera stops at the time point when the casing 1 is placed on the desk 20. Then image data obtained in the last image photographing is outputted to the display 5, and the photographed image is displayed on the image display surface as a standby image. Here, this photographed image is an image showing a surface of the desk 20 photographed immediately before the casing 1 is placed on the desk 20, and therefore, the whole telephone harmonizes with a color and design of the surface of the desk 20.

Also, at this point, the image data obtained in the last image photographing as described above is subjected to a complementary color conversion process for converting a color of each pixel into a complementary color which is located on the opposite side in the color wheel, and complementary color-converted data obtained in this process is stored in a memory. The complementary color conversion process is described later.

Thereafter, when an incoming call or mail is received, notification with sound and/or vibration is performed in a similar manner to the conventional telephones, and the complementary color-converted image data is outputted to the display 5, and a complementary color-converted image is displayed on the image display surface. Here, this complementary color-converted image is obtained by converting a color of each pixel of the image photographed immediately before the casing 1 is placed on the desk 20 into a complementary color which has the strongest contrast in relation to each color, and therefore, the whole telephone is seen distinctly on the desk 20. As a result, the user can easily find the telephone main body.

For example, when the mobile telephone is placed on a black desk, obtained is a photographed image which is wholly black. This image is converted into an image which is wholly white by the complementary color conversion process, and when a call or mail is received, the complementary color-converted image which is wholly white is displayed on the display 5.

Not only in the case where the casing 1 is placed on a desk or floor, but also in the case where the casing 1 is placed on the grass or a stump, the photographed image is displayed on the display 5 in a standby state for call/mail reception, and a complementary color-converted image is displayed on the display 5 when a call or mail is received in a similar manner.

If a received call or mail is not noticed and an off-hook operation is not performed, the complementary color-converted image is repeatedly displayed on the display 5 at a predetermined period until an operation of confirming the received call or mail is performed thereafter.

Figure 4:
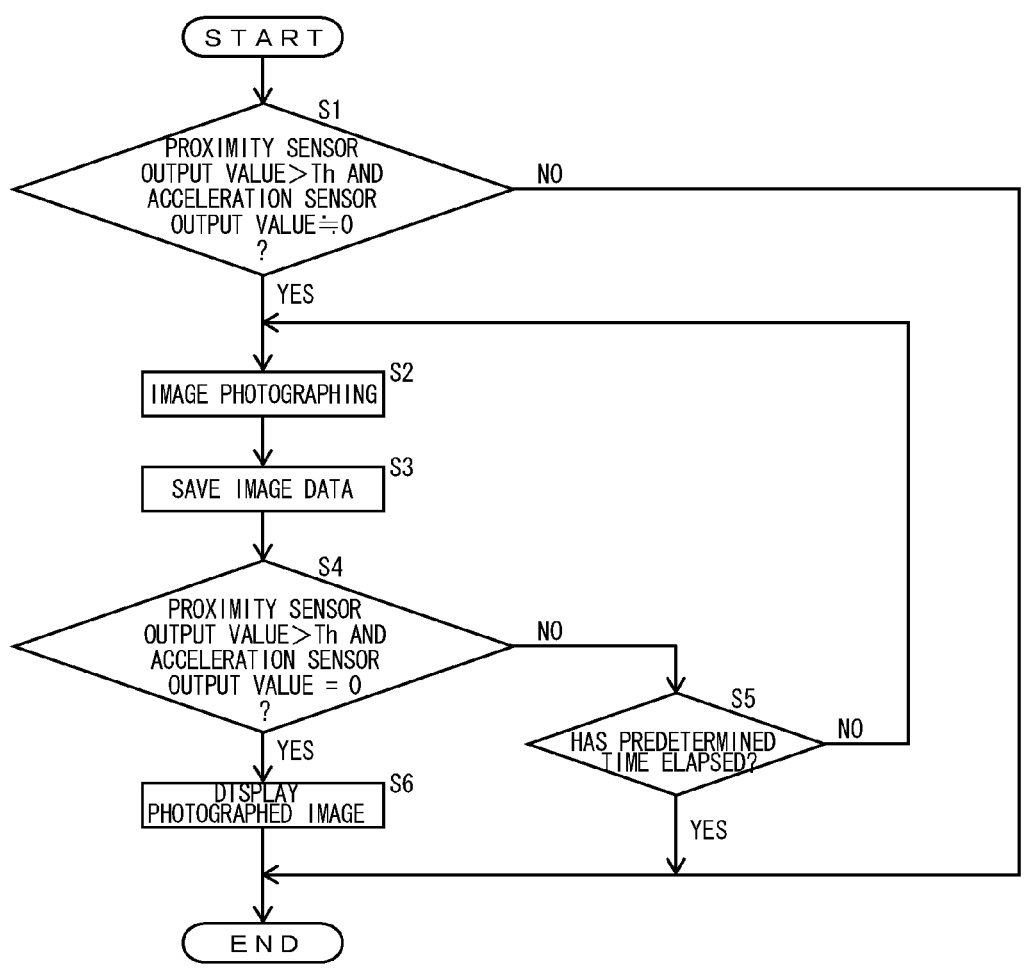
FIG. 4 is a flow chart representing a procedure that is performed in a state where power is supplied to the mobile telephone.

FIG. 4 shows a procedure that is performed by the control circuit 12 in a state where power is supplied to the telephone main body. Here, the proximity sensor and the acceleration sensor are activated when a power is supplied to the telephone main body.

First in step S1, it is determined whether or not an output value of the proximity sensor exceeds a predetermined threshold Th and an output value of the acceleration sensor is a value other than zero, to determine whether or not the casing 1 is becoming closer to an object. If the answer is NO, the procedure ends. Here, the threshold Th is set to a value of, for example, around 90% of the output value of the proximity sensor when the mobile telephone is placed with the rear surface of the casing facing downward. Also, as to the output value of the acceleration sensor, it is possible to set a predetermined threshold other than zero to determine whether or not the magnitude of the output value of the acceleration sensor exceeds the threshold. In this structure, it is possible to prevent an incorrect determination of that the telephone main body is becoming closer to an object although it remains stationary.

In a process of placing the casing on an object, when the casing reaches a position where a distance from the object is a certain distance, it is determined YES in step S1, and then the procedure proceeds to step S2, where the image photographing by the camera is performed. Thereafter in step S3, the image data obtained in the image photographing by the camera is stored in a memory. Subsequently in step S4, it is determined whether or not the output value of the proximity sensor exceeds the predetermined threshold Th and the output value of the acceleration sensor is zero, to thereby determine whether or not the casing has been placed on the object. If it is determined NO, the procedure proceeds to step S5, where it is determined whether or not a predetermined time has elapsed after it is determined YES in step S1. Here, if it is determined NO, the procedure returns to step S2, and the image photographing is performed again. By repeating the process of steps S2 to S5, the image photographing is repeated.

Thereafter, when the casing is placed on the object with the rear surface of the casing where the proximity sensor is arranged facing downward, it is determined YES in step S4, and the procedure proceeds to step S6, where the image data obtained in the last image photographing is read from the memory, and outputted to the display. As a result, the image photographed in the last photographing is displayed on the image display surface of the display.

If the casing is not placed on the object within a predetermined time after it is determined YES in step S1, it is determined YES in step S5, and then the procedure ends.

By performing the procedure described above, the image photographing by the camera is repeated from the time point when the casing reaches a position where a distance from the object is a certain distance, and thereafter, when the casing is placed on the object, the image photographed in the last photographing is displayed on the image display surface of the display as a standby image.

Figure 5:
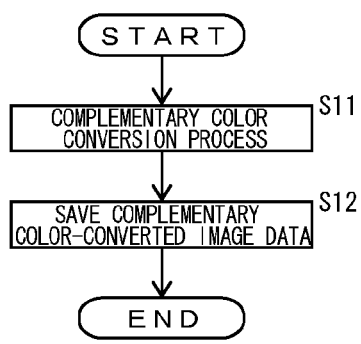
FIG. 5 is a flow chart representing a procedure that is performed when the mobile telephone is placed on an object.

FIG. 5 shows a procedure that is performed by the control circuit 12 when the casing is placed on an object. If the casing is placed on the object and it is determined YES in step S4 of FIG. 4, then in step S11 of FIG. 5, the image data for one frame obtained in the last image photographing is read from the memory, and the read image data is subjected to a complementary color conversion process which is described later.

When luminance of R data, G data and B data of three primary colors forming image data of one pixel is represented in double figures in hexadecimal notation, for example, red image data is represented as "FF0000" (R data=FF, G data=00, B data=00). The complementary color is a color which has such a relationship that when mixed with the original color, it becomes white, and white image data is represented as "FFFFFF". Therefore, in the complementary color conversion process, complementary color-converted image data can be obtained by subtracting the value of each color data from "FF". For example, the red image data "FF0000" is converted into light blue image data "00FFFF", and blue image data "0000FF" is converted into yellow image data "FFFF00". Here, the complementary color conversion process may be performed on each pixel or each block. After the complementary color conversion process is performed as described above, in step S12, the complementary color-conversed image data obtained in step S11 is stored in the memory, and then the procedure ends.

When the casing is placed on the object, by the above described procedure, the complementary color-converted image data is formed from the image data obtained in immediately prior image photographing, and is stored in the memory.

Figure 6:
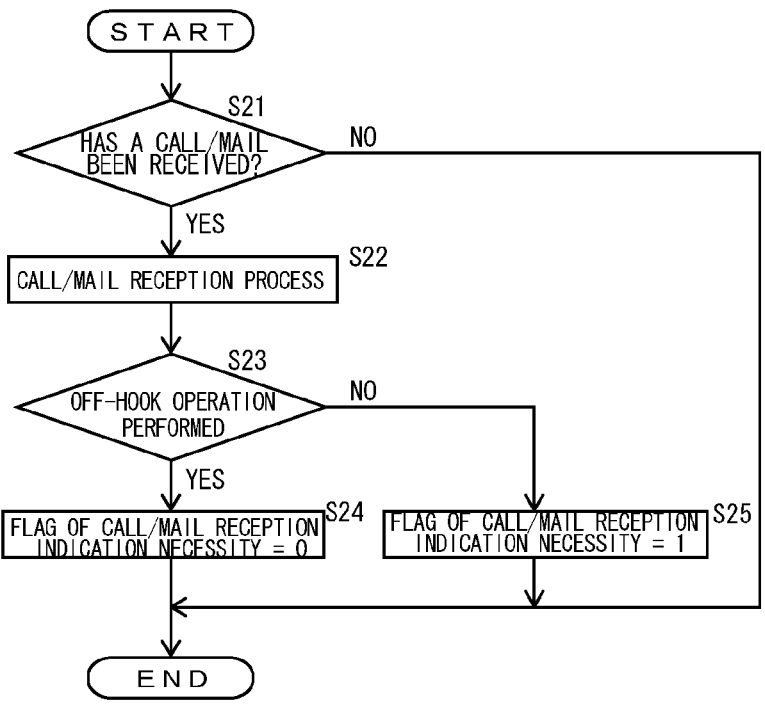
FIG. 6 is a flow chart representing a procedure that is performed after the mobile telephone is placed on an object.

FIG. 6 shows a procedure that is performed by the control circuit 12 after the casing is placed on the object. Here, the memory 15 stores a flag of call/mail reception indication necessity which indicates whether or not the call/mail reception indication needs to be repeated.

When the casing is placed on the object, first in step S21, it is determined whether or not a call or mail has been received, and if it is determined NO, the procedure ends, and if it is determined YES, the procedure proceeds to step S22, and a call/mail reception process is performed. In the call/mail reception process, in a similar manner to in the conventional phones, notification is performed with sound such as a melody and/or vibration of a vibrator in accordance with call/mail reception setting information set by the user, and according to the telephone number of transmission source, call/mail reception indication is performed, for example, with a pattern shown in FIG. 10. If the telephone number of transmission source is registered in a telephone book table in the memory, complementary color-converted image data stored in the memory is outputted to the display, and the complementary color-converted image is displayed on the image display surface of the display. If the telephone number of transmission source is registered in the telephone book table and the telephone number is the one specified by the user, the call/mail reception indication is performed in accordance with the call/mail reception indication pattern set by the user. In the cases: the telephone number of transmission source is not registered in the telephone book table; there is no telephone number of transmission source; or notification of the telephone number of transmission source is impossible, the call/mail reception indication is performed in accordance with preliminarily set default value "1", default value "2", or default value "3", respectively. If the telephone number is blocked, the above described photographed image is continuously displayed. In any of the cases, in a similar manner to in the conventional phones, the telephone number of transmission source and the name of the transmitter are displayed on the image display surface and a backlight is turned on.

Subsequently in step S23 of FIG. 6, it is determined whether or not the off-hook operation has been performed. If the user notices the received call or mail and the off-hook operation is performed, the procedure proceeds to step S24, and the flag of call/mail reception indication necessity is set to a value of "0" which means that the call/mail reception indication does not need to be repeated, and then the procedure ends. In contrast, if the user does not notice the received call or mail and the off-hook operation is not performed, the procedure proceeds to step S25, and the flag of call/mail reception indication necessity is set to a value of "1" which means that the call/mail reception indication needs to be repeated, and then the procedure ends.

By the process described above, when a call or mail is received, in a similar manner to in the conventional phones, notification is performed with sound such as a melody and/or vibration of the vibrator in accordance with the call/mail reception setting information set by the user, and the call/mail reception indication is performed according to the telephone number of transmission source. Here, if the telephone number of transmission source is registered in the telephone book table, the complementary color-converted image data obtained by performing the complementary color conversion on the image photographed immediately before the casing 1 is placed is displayed on the image display surface of the display.

Figure 7:
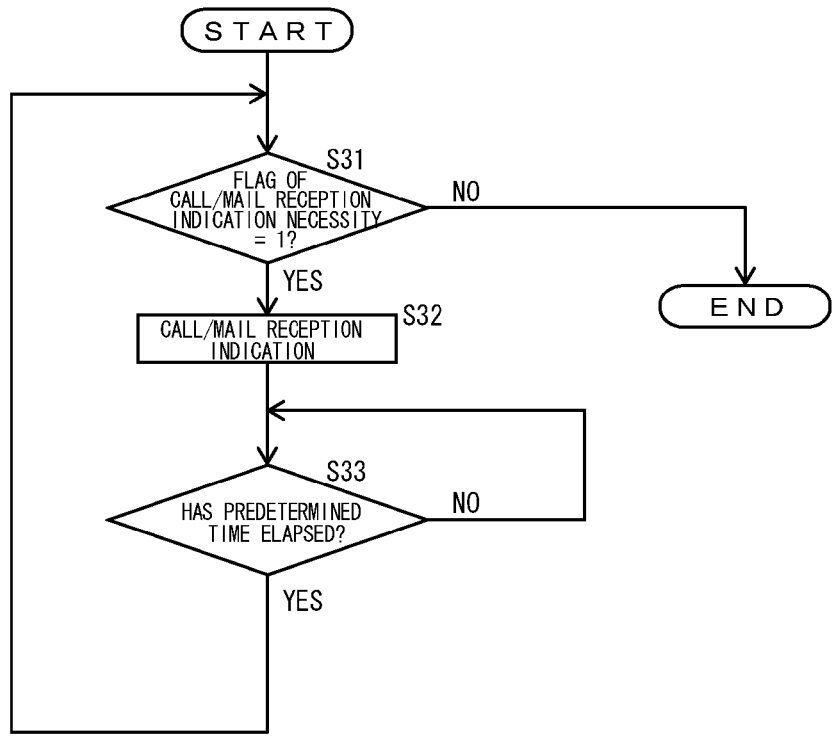
FIG. 7 is a flow chart representing a procedure after a call or mail is received.

FIG. 7 shows a procedure performed by the control circuit 12 after a call or mail is received. First in step S31, it is determined whether or not the value of the flag of call/mail reception indication necessity is "1". Here, if the user notices a received call or mail at the time when it is received and the off-hook operation is performed, the value of the flag of call/mail reception indication necessity is "0" as described above, and therefore, it is determined NO, and then the procedure ends. In contrast, if the user does not notice the received call or mail and the off-hook operation is not performed, the value of the flag of call/mail reception indication necessity is "1", and therefore, it is determined YES and the procedure proceeds to step S32, and then the call/mail reception indication described above is performed. Next in step S33, it is determined whether or not a predetermined time period has elapsed after the call/mail reception indication is performed. If it is determined NO, the same determination is repeated in step S33. Thereafter, when the predetermined time period has elapsed and it is determined YES in step S33, the procedure returns to step S31, and the value of the flag of call/mail reception indication necessity is determined again.

By repeating the process of steps S31 to S33, the call/mail reception indication is repeatedly performed at the predetermined time period, and thereafter, when the user performs an operation of confirming the received call or mail and the value of the flag of call/mail reception indication necessity is rewritten to "0", it is determined NO in step S31, and then the procedure ends.

By the above described process, if the off-hook operation is not performed when a call or mail is received, the call/mail reception indication is repeatedly performed at the predetermined time period until the user performs the operation of confirming the received call or mail.

Figure 8:
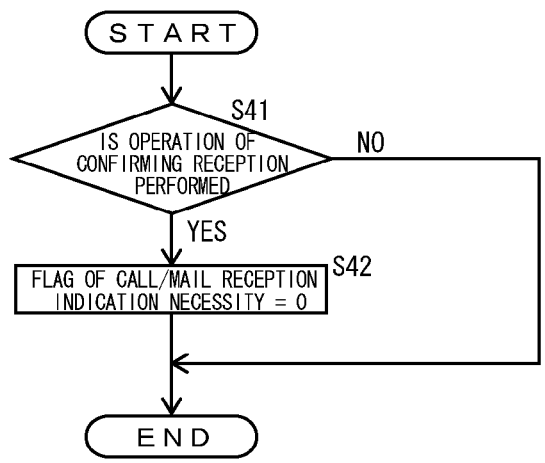
FIG. 8 is a flow chart representing a procedure of overwriting a flag of call/mail reception indication necessity.

FIG. 8 shows a procedure of rewriting a flag of call/mail reception indication necessity performed by the control circuit 12. In step S41, it is determined whether or not the operation of confirming the received call or mail has been performed by the user. If it is determined NO, the procedure ends. In contrast, if it is determined YES, the procedure proceeds to step S42, and the value of the flag of call/mail reception indication necessity is rewritten to "0", and then the procedure ends.

By the process described above, when the operation of confirming the received call or mail is performed by the user, the flag of call/mail reception indication necessity is rewritten, and the call/mail reception indication process shown in FIG. 7 after the call or mail is received thereby ends.

As described above, in the mobile telephone according to the present invention, for example, immediately before the telephone is placed on a desk, the surface of the desk is photographed, and the photographed image is displayed on the image display surface of the display 5 as a standby image. Therefore, the whole telephone harmonizes with the color or design of the surface of the desk, and it is possible to prevent to attract attention of people around the telephone.

Also, when a call or mail is received, the complementary color-converted image which has a color contrasting to the photographed image is displayed on the image display surface of the display 5, and therefore, the whole telephone is seen distinctly on the desk, and the user can easily find the telephone.

Further, even if the received call or mail is not noticed at the time when it is received, thereafter the call/mail reception indication is repeatedly performed until the user performs the operation of confirming the received call or mail. Therefore, the user can be informed of the received call or mail for certain.

The present invention is not limited to the foregoing embodiment in construction but can be modified variously within the technical scope as set forth in the appended claims.

For example, in the embodiment described above, colors of all pixels forming the image data for one frame obtained in the image photographing by the camera are converted into their complementary colors in the color conversion process. However, it is possible to convert only a color of a part of the pixels into its complementary color. For example, it is possible to convert only a color of the pixel which forms the biggest part of the image data for one frame.

Also, in the color conversion process, the color of each pixel is converted into the complementary color by subtracting the value of each color data of R data, G data and B data from "FF". However, not only the conversion rule for converting into the complementary colors, but also various conversion rules for converting into a color which is located in generally opposite side in the color wheel can be employed.

Further, in the embodiment described above, the image photographing by the camera is repeated from the time when it is determined that the casing 1 is becoming closer to an object and until it is determined that the casing 1 has been placed on the object, and the last photographed image is displayed on the display 5 as the standby image and the complementary color-converted image of this image is displayed on the display 5 when a call or mail is received. However, not only the last photographed image, any of the images obtained in the photographing may be displayed on the display 5 as the standby image, and the color-converted image of any of the images may be displayed on the display 5.

Also, it is possible to employ the structure in which the image photographing by the camera 7 is performed only when it is determined that the casing 1 is becoming closer to an object. In such a structure, the threshold of the proximity sensor which is used for determining that the casing 1 is becoming closer to an object is set to a value in accordance with a distance from the object to a position where the lens of the camera 7 comes into focus.

Further, it is possible that the image photographing by the camera 7 is performed when a predetermined user operation is performed, and the image obtained in this image photographing is displayed on the display 5 as the standby image while the color-converted image of this image is displayed on the display 5 when a call or mail is received.

Further, the image photographing by the camera 7 is repeatedly performed from the time when the power is supplied to the telephone main body, or from the time when the predetermined user operation is performed, and then, when it is detected that the casing 1 has been placed on an object, any of the images photographed before then is displayed on the display 5 as the standby image while the color-converted image of this image is displayed on the display 5 when a call or mail is received.

Further, it is possible to employ the structure in which an image display mode of displaying the photographed image on the display 5 as the standby image and displaying the color-converted image of this image on the display 5 when a call or mail is received can be set and canceled, and the procedure shown in FIG. 4 is repeatedly performed when the user performs a predetermined mode setting operation for setting this image display mode. Here, in this structure, the proximity sensor 8 and the acceleration sensor 16 are activated when the predetermined mode setting operation is performed, and maintained in ON state with the image display mode set.

Also, in the embodiment described above, it is detected that the casing 1 is becoming closer to an object, and that the casing 1 has been placed on the object by the proximity sensor 8 and the acceleration sensor 16. However, such detection can be performed with separately provided proximity sensor and acceleration sensor.

Further, when a call or mail is received, the call/mail reception indication can be performed with a pattern shown in FIG. 11 or 12 as well as the pattern shown in FIG. 10. Here, the "photographed image" in the drawings represents the image photographed before it is detected that the casing 1 has been placed on the object.

It is also possible to use two or more conversion rules in the color-conversion process to form a plurality of kinds of color-converted images from one photographed image. In an example shown in FIG. 11, two kinds of color-converted images with different luminance are formed, and if the telephone number of transmission source is registered in the telephone book table, the color-converted image with lower luminance is displayed on the display, while if the telephone number of transmission source is registered in the telephone book table and the telephone number is the specified one, the color-converted image with higher luminance is displayed on the display.

Further, as well as the structure in which when a call or mail is received after the casing 1 is placed on an object, the color-converted image obtained by performing color conversion of the photographed image is displayed on the display 5, it is also possible to employ another structure in which other contrasting image is displayed. For example, it is possible to employ a structure in which if the image photographed by the camera 7 is comprised of one color, an image comprised of one color different from that of the original image or an image having a design (pattern) is displayed, and if the image photographed by the camera 7 has a design (pattern), an image comprised of one color or an image having a contrasting design (pattern) to the original image is displayed. Here, the image displayed on the display 5 may be prepared in advance and stored in the memory, or may be formed when the photographed image is obtained or when a call or mail is received. Also, the image displayed on the display 5 may be formed from the photographed image or obtained externally via communication line.

Furthermore, the present invention may be implemented not only in the straight mobile telephone shown in FIGS. 1 and 2, but also in a sliding mobile telephone having a casing comprising an upper half case and a lower half case which engage with each other in a vertically slidable manner, or a foldable mobile telephone having a casing comprising a base case and a lid case coupled to each other via a hinge mechanism.

What is claimed is:

1. A mobile telephone comprising a portable casing including an image display surface of an image display apparatus arranged on a front surface thereof and an image pickup apparatus arranged on a rear surface thereof, comprising:
a state detecting unit that detects that the casing is becoming closer to an object and that the casing has been placed on the object;
a photographing control unit that operates the image pickup apparatus at least once after it is detected that the casing is becoming closer to the object and before it is detected that the casing has been placed on the object;
a color conversion processing unit that performs a color conversion process for converting a color of each of a part or all pixels forming an image signal obtained from the image pickup apparatus before it is determined that the casing has been placed on the object in accordance with a predetermined conversion rule on the image signal;
an image signal storing unit that stores one or a plurality of color-converted image signals obtained from the color conversion processing unit; and
a call/mail reception image display processing unit that, when an incoming call or mail is received after it is detected that the casing has been placed on the object, outputs one of the one or plurality of color-converted image signals stored in the image signal storing unit to the image display apparatus to display a color-converted image on the image display surface of the image display apparatus.

2. The mobile telephone according to claim 1, wherein after a call or mail is received, the call/mail reception image display processing unit repeats operation of displaying the color-converted image on the image display surface of the image display apparatus until a user operation is performed.

3. The mobile telephone according to claim 1, wherein the photographing control unit operates the image pickup apparatus repeatedly after it is detected that the casing is becoming closer to the object and before it is detected that the casing has been placed on the object, and the color conversion processing unit performs the color conversion process on the image signal obtained in the last photographing operation.

4. The mobile telephone according to claim 1, comprising a photographed image display processing unit that, when it is detected that the casing has been placed on the object, outputs the image signal obtained from the image pickup apparatus to the image display apparatus to display the original photographed image on the image display surface of the image display apparatus.

5. The mobile telephone according to claim 4, wherein the call/mail reception image display processing unit comprises:
a selecting unit that selects an image in accordance with a telephone number or address of transmission source from a plurality of kinds of images including one or a plurality of color-converted images and the original photographed image; and
a display processing unit that displays the image selected by the selecting unit on the image display surface of the image display apparatus.

6. The mobile telephone according to claim 1, wherein the state detecting unit comprises an acceleration sensor for detecting acceleration of the casing, and a proximity sensor arranged on the rear surface of the casing for detecting a distance from the object, and detects that the casing is becoming closer to the object based on an output value of the acceleration sensor and an output value of the proximity sensor, and that the casing has been placed on the object based on an output value of the acceleration sensor and an output value of the proximity sensor.

7. The mobile telephone according to claim 1, wherein the color conversion processing unit that performs a color conversion process for converting a color of each of a part or all pixels forming an image signal obtained from the image pickup apparatus into a complementary color which is located on the opposite side in a color wheel or into a color which is located on the generally opposite side in the color wheel in accordance with one or a plurality of predetermined conversion rules on the image signal.

8. In a mobile telephone comprising a portable casing including an image display surface of an image display apparatus arranged on a front surface thereof and an image pickup apparatus arranged on a rear surface thereof, a method for displaying an image on the image display surface, comprising the step of:

detecting that the casing is becoming closer to an object and the casing has been placed on the object;

operating an image pickup apparatus at least once after the casing is becoming closer to an object and before it is detected that the casing has been placed on the object;

performing a color conversion process for converting a color of each of a part or all pixels forming an image signal obtained from the image pickup apparatus before it is determined that the casing has been placed on the object in accordance with a predetermined conversion rule on the image signal;

storing one or a plurality of color-converted image signals from the color conversion process; and outputting one of the one or plurality of color-converted image signals and displaying a color-converted image on the image display surface when an incoming call or mail is received after it is detected that the casing has been placed on the object.

9. The display method according to claim 8, wherein the steps of outputting the color-converted image signals and displaying the color-converted image repeat operation of displaying the color-converted image until a user operation is performed after a call or mail is received.

10. The display method according to claim 8, wherein the step of operating the image pickup apparatus operates the image pickup apparatus repeatedly after it is detected that the casing is becoming closer to the object and before it is detected that the casing has been placed on the object, and wherein the step of performing a color conversion process performs the color conversion process on the image signal obtained in the last photographing operation.

11. The display method according to claim 8 further comprising the step of:

outputting the image signal and displaying the original photographed image on the image display surface when it is detected that the casing has been placed on the object.

12. The display method according to claim 8, wherein the step of displaying on the image display surface comprises the step of:

selecting an image in accordance with a telephone number or address of transmission source from a plurality of kinds of images including one or a plurality of color-converted images and the original photographed image; and displaying the selected image on the image display surface.

13. The display method according to claim 8, wherein the step of detecting that a casing has been placed on the object comprises the steps of:

detecting acceleration of the casing; and detecting a distance from the object;

wherein the step of detecting detects that the casing is becoming closer to the object, and that the casing has been placed on the object.

14. The display method according to claim 8, wherein the step of performing the color conversion processing performs a color conversion process for converting a color of each of a part or all pixels forming an image signal into a complementary color which is located on the opposite side in a color wheel or into a color which is located on the generally opposite side in the color wheel in accordance with one or a plurality of predetermined conversion rules on the image signal.

* * * * *